R. E. HELLMUND AND B. S. MOORE.
SHAFT BEARING.
APPLICATION FILED FEB. 19, 1917.

1,329,241.

Patented Jan. 27, 1920.
2 SHEETS—SHEET 1.

WITNESSES:
Fred. A. Lind.
O. W. Kennedy

INVENTOR
Rudolf E. Hellmund
Benjamin S. Moore
BY
Wesley G. Carr
ATTORNEY

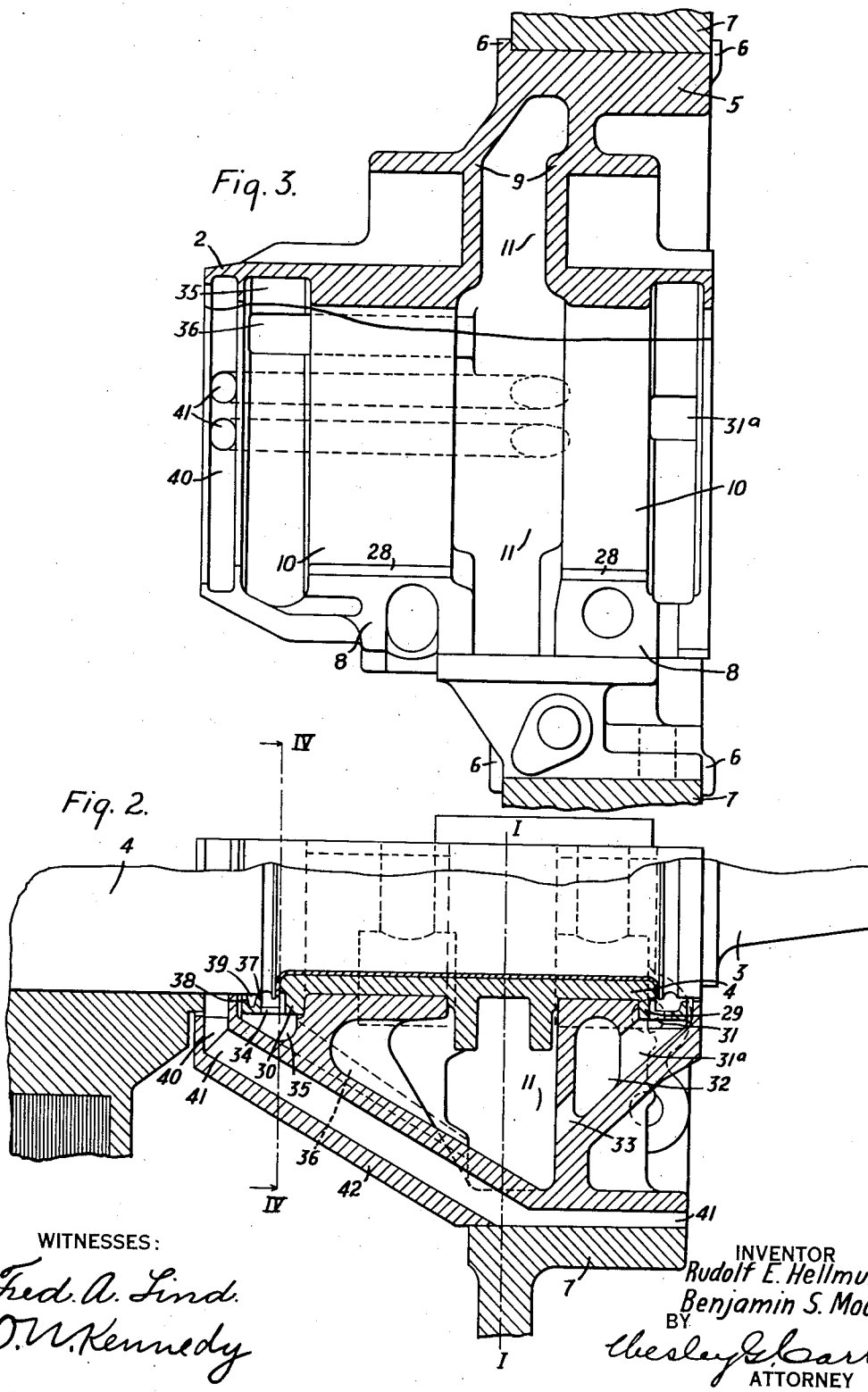

UNITED STATES PATENT OFFICE.

RUDOLF E. HELLMUND, OF SWISSVALE, AND BENJAMIN S. MOORE, OF WILKINSBURG, PENNSYLVANIA, ASSIGNORS TO WESTINGHOUSE ELECTRIC AND MANUFACTURING COMPANY, A CORPORATION OF PENNSYLVANIA.

SHAFT-BEARING.

1,329,241.      Specification of Letters Patent.      Patented Jan. 27, 1920.

Application filed February 19, 1917. Serial No. 149,480.

*To all whom it may concern:*

Be it known that we, RUDOLF E. HELLMUND, a subject of the Emperor of Germany, and a resident of Swissvale, in the county of Allegheny and State of Pennsylvania, and BENJAMIN S. MOORE, a citizen of the United States, and a resident of Wilkinsburg, in the county of Allegheny and State of Pennsylvania, have invented a new and useful Improvement in Shaft-Bearings, of which the following is a specification.

Our invention relates to shaft bearings, and it has for its object to provide a bearing embodying certain novel features in its oiling system that particularly adapt it to be used in connection with dynamo-electric machines of large capacity.

Shaft bearings of the above-designated type, as heretofore constructed, have usually comprised upper and lower housing members and a split bearing, each half-portion of which is located within one of the housing members. It has been found that there is a tendency for oil to squirt through the split in the bearing and to leak out between the housing members, as both the bearing and the housing are usually split in the same plane. According to the present invention, we provide means for effectively draining the oil that squirts through the bearing split so that the above-described leakage between the housing members is substantially avoided.

It is also well known that the difference in pressure existing between the inside of the inclosing casing of a dynamo-electric machine provided with forced ventilation and the outside atmosphere often tends to force oil away from the bearing surfaces that are adjacent to the machine-end of the bearing, thereby resulting in uneven lubrication and heating of the bearing surfaces. We propose to overcome the above-described difficulty by providing a chamber adjacent to the machine-end of the bearing that is always maintained at atmospheric pressure.

Figure 1:
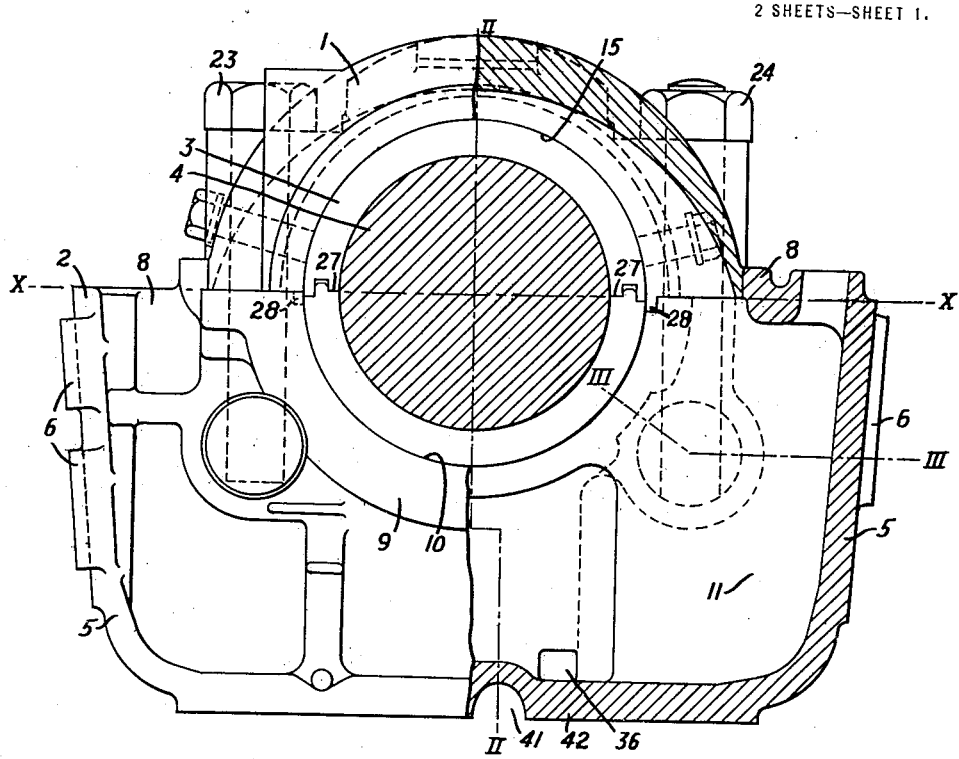
Figure 4:
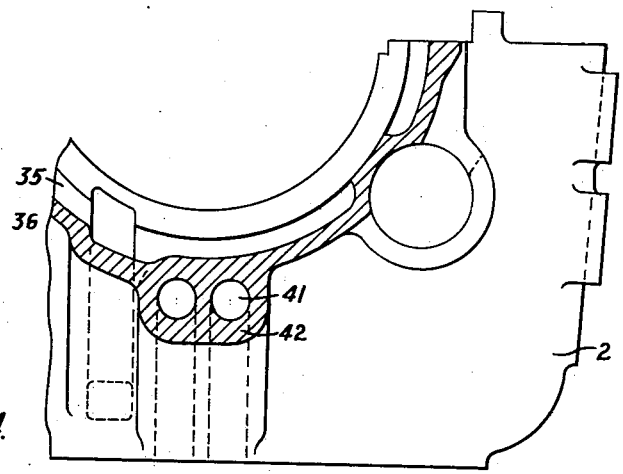

Referring to the accompanying drawings, Figure 1 is a view, partially in section and partially in end elevation, of a bearing embodying our invention; Fig. 2 is a longitudinal sectional view along the line II—II of Fig. 1, also showing a portion of the associated dynamo-electric machine; Fig. 3 is a view, partially in plan and partially in section, along the line III—III of Fig. 1, of only the lower housing member shown therein, and Fig. 4 is a fragmentary sectional view along the line IV—IV of Fig. 2, looking from left to right.

Referring to Fig. 1, the bearing comprises upper and lower housing members 1 and 2, respectively, within which is located a bearing 3 for supporting a shaft 4. The lower housing member is substantially of cup-shape in transverse cross-section, the side walls 5 thereof being respectively provided with pairs of end flanges 6—6 between which are located supporting portions of the frame 7 of a dynamo-electric machine. The walls 5 are further provided with overhanging portions 8 between which extends a substantially semi-annular portion 9, the inner surface of which is machined to form a semi-cylindrical seat 10 for the bearing 3. As best shown in Figs. 2 and 3, the portion 9 is hollow, thereby providing an oil reservoir 11 intermediate the ends of the bearing seat 10. The upper member 1 of the housing is semi-annular in form and is provided with an inner bearing seat 15, the engaging longitudinal faces of the housing members 1 and 2 lying in a horizontal plane X—X that passes through the axis of the shaft 3. The housing members are secured together by suitable bolts 23 and 24, each of which is in threaded engagement with a cylindrical nut, the axis of which is perpendicular to that of the bolt. These nuts are rotatably disposed within similarly shaped sockets. When it is desired to remove the upper housing member the bolts 23 and 24 are loosened so as to move them out of engagement with the lugs which they normally rest upon; they are then rotated about the cylindrical nuts as axes until they are outside of the path through which the upper housing member must move to be removed, and the housing member in question is then removed.

The bearing 3 comprises substantially identical half-portions that are located in the seats 10 and 15, respectively. The bearing is split along diametrically disposed broken longitudinal lines 27—27, the inner portions thereof, adjacent to the shaft 3, lying in the plane X—X and the outer portions thereof, adjacent to the bearing seat 10, lying below the plane X—X. It will thus be impossible for oil squirting between the bearing portions to enter directly into the split between the housing members. Furthermore, oil leaking through the split in the bearing 3 will be received in longitudinal grooves 28 that are provided in the lower housing member 2. The grooves 28 drain into the central oil reservoir 11 and are closed at their ends by end flanges 29 and 30 of the bearing 3. As best shown in Figs. 2 and 3, the flange 29 is provided with an oil-draining opening 31 that registers with a passage 31ª leading to a chamber 32 provided in the housing member 2 which, in turn, is connected to the oil-reservoir 11 by a passage 33. The flange 30 is provided with an oil-draining opening 34 that discharges into a chamber 35 which, in turn, is connected to the oil-reservoir 11 by a passage 36. The flange 30 is further provided with a rim portion 37 within which is formed a circumferential groove 38. A wiper-ring 39 of felt or other similar absorbent material is located in the groove 38 and is in close engagement with the surface of the shaft 4.

The lower housing member 2 is further provided with a chamber 40 adjacent to the machine-end of the bearing 3 that is maintained at atmospheric pressure by passages 41 which extend through a projection 42 provided on the bottom of the housing member and are open to the air at points outside of the inclosing frame 7 of the dynamo-electric machine. It will be readily understood that, as the air within the inclosing casing 7 is above atmospheric pressure, because of the ventilating currents circulating therein, there will be a tendency for the air to creep along the shaft 4 to the bearing surfaces. However, when air above atmospheric pressure enters the chamber 40, the difference in pressure will immediately be equalized, thereby insuring that all parts of the bearing will operate at substantially atmospheric pressure.

From the foregoing, it is apparent that a bearing constructed in accordance with our invention is particularly adapted to be used in connection with dynamo-electric machines as it embodies novel arrangements in its oiling system that enables it to operate under the most advantageous conditions.

While we have shown our invention applied to one form of bearing, it is not so limited but is susceptible of various modifications without departing from the spirit of the invention and within the scope of the appended claims.

We claim as our invention:

1. In a shaft bearing, the combination with a housing having an inner cylindrical surface provided with longitudinal grooves, of a divided bearing located within said housing, the lines of division of said bearing opening into said grooves.

2. In a shaft bearing, the combination with a housing having an inner cylindrical surface provided with longitudinal grooves, of a divided bearing located within said housing, the line of division of said bearing opening into said grooves, the walls of said grooves adjacent said bearing being shorter than the other walls.

3. A shaft bearing comprising a housing and a divided bearing located within said housing, the said housing being provided with oil-draining grooves along the split of said bearing and means for preventing oil from flowing out of the ends of said grooves.

4. A shaft bearing comprising a housing and a divided bearing located within said housing, the said housing being provided with oil-draining grooves along the split of said bearing, and the said bearing being provided with end flanges closing said grooves.

5. A shaft bearing comprising a housing member having an inner cylindrical surface and a bearing located therein, the said housing projecting beyond the end of said bearing and having an annular groove communicating with the outside of said housing by means of longitudinally extending grooves.

6. A shaft bearing comprising a housing member having an inner cylindrical surface and a bearing located therein, the said housing having a portion projecting beyond the end of said bearing and provided with an annular groove and means for maintaining atmospheric pressure in said groove consisting of passages cast in said housing member.

7. In a shaft bearing, the combination with an inclosing casing, a shaft and a bearing for said shaft projecting within said casing, of means for maintaining substantially uniform air pressure in all parts of said bearing, comprising longitudinally extending passages cast in said housing.

8. In a shaft bearing for an inclosed machine, the combination with an inclosing casing, a shaft and a bearing for said shaft projecting within said casing, of means for equalizing the pressure existing within said casing and that of the surrounding atmosphere at points adjacent to said bearing.

9. In a shaft bearing for an inclosed machine, the combination with an inclosing casing, a shaft and a bearing for said shaft disposed within said casing, of a portion of said casing projecting beyond said bearing and forming an annular groove at the machine end of the bearing and longitudinally extending passages connecting said annular groove with the outside atmosphere.

10. In a shaft bearing, the combination with a split housing having an inner cylindrical surface, of grooves cut in the inner cylindrical surface of one of said housing members below the level of the line of division between the housing members.

In testimony whereof, we have hereunto subscribed our names this 31st day of January, 1917.

RUDOLF E. HELLMUND.
BENJAMIN S. MOORE.